UNITED STATES PATENT OFFICE.

HENRY SPENCER BLACKMORE, OF MOUNT VERNON, NEW YORK.

PROCESS OF MAKING SULFURIC ANHYDRID.

SPECIFICATION forming part of Reissued Letters Patent No. 11,995, dated May 27, 1902.

Original No. 686,022, dated November 5, 1901. Application for reissue filed March 29, 1902. Serial No. 100,630.

*To all whom it may concern:*

Be it known that I, HENRY SPENCER BLACKMORE, a citizen of the United States, residing at Mount Vernon, in the county of Westchester and State of New York, have invented certain new and useful Improvements in Processes of Producing Sulfuric Anhydrid; and I do hereby declare the following to be a full, clear, and exact description of the invention, such as will enable others skilled in the art to which it appertains to make and use the same.

The object of my invention is to produce sulfuric anhydrid, (sulfur trioxid;) and it consists in oxidizing sulfur dioxid by the action of a metallic oxid or substances containing the same—in other words, substances containing an oxidizing agent, such as metallic oxid.

My invention also consists in producing sulfuric anhydrid by oxidizing sulfur dioxid at a temperature maintained below the dissociating-point of sulfuric anhydrid, which maintenance of temperature and the results attained thereby are hereinafter set forth.

The history of the art to which my invention appertains shows that sulfuric anhydrid ($SO_3$) has heretofore been produced by the combination of sulfur dioxid ($SO_2$) with oxygen. It also shows that the product of the prior processes has always fallen below the theorectical yield—that is to say, that the quantity of $SO_3$ actually produced by the processes heretofore known has probably not exceeded sixty-seven per cent. of the amount which a complete chemical union of the sulfur dioxid and oxygen should produce. Professor Lunge, speaking of these prior processes at the end of the year 1897 in *The Mineral Industries of the United States and other Countries*, page 130, said: "Probably sixty-seven per cent. must be considered very good work, and the remaining thirty-three per cent. of sulfurous acid must be sent into lead chambers, together with better gas from other burners." While the fact of this low percentage of yield has long been known to those who are familiar with the art, no previous investigator has ascertained the cause of the same or suggested a remedy for the difficulty. I have discovered that the deficiency in the quantity of sulfuric anhydrid produced by the processes heretofore known was due to the high and accumulating heat at which the reaction between the sulfur dioxid and the oxygen was conducted and that by properly controlling the temperature of reaction a substantially complete union of the sulfur dioxid and oxygen and a practically quantitative yield of sulfuric anhydrid may be obtained.

In all previous processes mixtures of sulfur dioxid and oxygen or oxidizing agents were heated to the combining-point by the application of extraneous heat; but in the performance of these processes the chemical union of the sulfur dioxid and the oxygen evolved a large amount of heat, which when added to the extraneous or initial heat caused the temperature within the sphere of reaction to rise above the point at which sulfuric anhydrid is dissociated, the result having been in every instance that at least thirty per cent. of the product was by dissociation resolved into sulfur dioxid and oxygen again, which, as stated by Professor Lunge, had to be treated separately in lead chambers, into which better gas from other sources was admitted. It has been proposed to combine volumes of sulfur dioxid and oxygen heated to a combining temperature in the presence of contact substances, such as spongy platinum or oxids of chromium or of iron or of copper, at or about a dull-red heat or somewhat below that temperature; but nothing is revealed regarding the excessive accumulation of the heat, 32.2 calories per unit, (Thomsen,) which is necessarily liberated by the combination of sulfur dioxid with oxygen; nor is any means indicated for preventing the heat thus liberated from rising to the dissociating-point of sulfuric anhydrid, the combining gases being at an initial temperature, which by the added heat of combination must necessarily rise to a much higher degree until the point at which sulfuric anhydrid is dissociated is reached, thus terminating the process unless restrained by some refrigerative influence, the necessity of which was unknown.

The external heat which I supply to the retort is used merely for the purpose of starting the reaction, which after being initiated may be maintained thereby and by the heat which is liberated by the oxidation of the sulfur dioxid. The sulfur dioxid may, as hereinafter stated, be heated before being admitted to the retort in order to assist in the maintenance of the combining temperature within the sphere of reaction. Should the temperature rise too rapidly during reaction, refrigeration may be resorted to for the purpose of keeping the temperature below the dissociating-point of sulfuric anhydrid.

In view of the foregoing it is clear that the temperature must not be allowed to rise above the dissociating-point of sulfuric anhydrid, for otherwise the sulfuric anhydrid, if produced, would either in whole or in part be dissociated. Should the sulfur dioxid be introduced into the retort without being heated above the ordinary temperature of the air, which is its normal temperature, it will act as a refrigerant and by its cooling action operate to keep the temperature within the reaction sphere considerably below the point at which the sulfuric anhydrid dissociates.

It is well known that certain metals—such as iron, copper, &c.—have a variable affinity for oxygen, according to the temperature at which maintained. For example, steam passed over iron at white heat is decomposed, producing iron oxid and hydrogen gas, while if the temperature of the iron oxid thus produced is lowered to a low red heat and the same hydrogen gas conducted over it the affinities are so reversed that the oxygen is again taken up by the hydrogen, regenerating steam and reducing the iron to a metallic state, known commercially as "iron-by-hydrogen." Utilizing this property of the metal, I have conducted sulfur dioxid over iron oxid at low temperatures—*i. e.*, below the dissociating-point of sulfur trioxid (sulfuric anhydrid)—and found that it has the property of absorbing the oxygen therefrom, reducing iron oxid and producing sulfur trioxid, (sulfuric anhydrid,) which distils or sublimes and is finally condensed.

The reaction which takes place may be illustrated by the following chemical formula or equation: Employing ferric oxid—

$$3SO_2+Fe_2O_3=2Fe+3SO_3.$$

Employing ferroso ferric oxid—

$$4SO_2+Fe_3O_4=3Fe+4SO_3.$$

It is obvious from the foregoing that the temperature must not be maintained above the dissociating-point of sulfur trioxid, (sulfuric anhydrid;) otherwise it would preclude its formation.

The manner in which I proceed to carry out my process on a commercial scale is to place in a retort or container iron oxid and temporarily heat the same slightly—say about 212° Fahrenheit—to start the operation by eliminating moisture, then conveying over or through the said iron oxid sulfur dioxid which has preferably been heated, so that thereafter the reaction may be maintained by the occluded heat of the sulfur dioxid, and thus avoiding the application of directly-applied heat as much as possible, which is hard to regulate and keep below the dissociating-point of the sulfur trioxid (sulfuric anhydrid) produced. The heated sulfur dioxid passed over the metallic oxid in ordinary cases sufficiently heats the same after starting the reaction to assure the reaction continuously until the iron oxid is reduced. Also considerable heat is liberated by the oxidation of the sulfur dioxid in direct contact with the metallic oxid, so that the reaction is practically maintained after the first heating, which merely serves to start the reaction, by the combined heat of that occluded by the introduced sulfur dioxid and that liberated during reaction. The sulfur trioxid (sulfuric anhydrid) produced is distilled or sublimed and finally condensed. The iron reduced by oxidation of the sulfur dioxid is then reoxidized by simply elevating the temperature and passing air or oxygen over the same, so that the oxidizing agent (metallic oxid) is regenerated and reused over and over again without loss, thus rendering the process practically continuous.

It is obvious that other metals, such as copper, may be employed without departing from the spirit of my invention, which specifically consists in oxidizing sulfur dioxid by the action of metallic oxid.

If metallic oxid heats too rapidly during reaction, it may be refrigerated to keep below dissociating-point of sulfuric anhydrid.

When cupric oxid is employed, the reaction may be illustrated by the following chemical formula or equation:

$$SO_2+CuO=Cu+SO_3.$$

The term "metallic oxid" or "iron oxid" as herein employed is intended to include any substance containing a metallic oxid which will give up its oxygen to oxidize sulfur dioxid to sulfur trioxid under the conditions described as well as the pure metallic oxid *per se*.

Having now described my invention, what I claim as new, and desire to secure by Letters Patent, is—

1. The process of producing sulfuric anhydrid ($SO_3$), which consists in oxidizing sulfur dioxid by the action of metallic oxid, substantially as described.

2. The process of producing sulfuric anhydrid, which consists in conveying sulfur dioxid in contact with metallic oxid at a temperature below the dissociating-point of sulfur trioxid.

3. The process of producing sulfuric anhydrid, which consists in exposing a metallic oxid to the action of heated sulfur dioxid while maintaining the temperature below the dissociating-point of sulfuric anhydrid.

4. The continuous process of producing sulfuric anhydrid ($SO_3$) which consists in exposing metallic oxid to the action of sulfur dioxid at a temperature below the dissociating-point of sulfur trioxid, conveying the sulfur trioxid produced to a condenser, elevating the temperature of the metallic residue, passing oxygen over the same, cooling, exposing the product to the action of more sulfur dioxid and continuing the process as before.

5. The process of producing sulfuric anhydrid, which consists in exposing iron oxid to the action of sulfur dioxid in a heated state and maintaining the temperature below the dissociating-point of sulfuric anhydrid, substantially as described.

6. The process of making sulfuric anhydrid, which consists in oxidizing sulfur dioxid while maintaining the temperature below the dissociating-point of sulfur trioxid, substantially as described.

7. The process of producing sulfuric anhydrid, which consists in conveying sulfur dioxid in contact with an oxidizing agent at a temperature below the dissociating-point of sulfur trioxid, substantially as described.

8. The process of making sulfuric anhydrid, which consists in subjecting sulfur dioxid to the action of an oxidizing agent while maintaining the temperature below the dissociating-point of sulfur trioxid, substantially as described.

9. The process of making sulfuric anhydrid, which consists in oxidizing sulfur dioxid and maintaining the temperature below the dissociating-point of sulfur trioxid by refrigeration, substantially as described.

10. The process of making sulfuric anhydrid, which consists in uniting sulfur dioxid with oxygen while maintaining the temperature between the combining and dissociating point of sulfur trioxid by controlled heat and refrigeration, substantially as described.

11. The process of making a compound composed of one atom of sulfur and three atoms of oxygen which consists in uniting substances forming the compound while maintaining the temperature below the dissociating-point of sulfuric anhydrid by refrigeration, substantially as described.

In testimony whereof I affix my signature in presence of two witnesses.

HENRY SPENCER BLACKMORE.

Witnesses:

WARREN C. STONE,

C. C. WRIGHT.

Order of Cancellation of Reissue Letters Patent No. 11,995.

DEPARTMENT OF THE INTERIOR,

UNITED STATES PATENT OFFICE,

WASHINGTON, D. C., *March 25, 1908.*

*Whereas*, On November 27, 1907, the Circuit Court of the United States for the Southern District of New York held Reissue Patent No. 11,995 "revoked, vacated, and declared null and void," in a decree which has been recorded in Liber H, 78, page 497, of the assignment records of the United States Patent Office,

*It is hereby ordered*, That the record of the said reissue patent be marked *Canceled.*—[*Official Gazette, March 31, 1908.*]

E. B. MOORE,

*Commissioner.*